(12) United States Patent
Bernal et al.

(10) Patent No.: US 9,210,911 B2
(45) Date of Patent: Dec. 15, 2015

(54) TOILET EQUIPMENT FOR DOMESTIC ANIMALS, IN PARTICULAR FOR DOGS

(75) Inventors: Gerard Bernal, Casablanca (MA); Carmen Challier, Casablanca (MA)

(73) Assignee: SPARTEL ENGINEERING, Tangier (MA)

(*) Notice: Subject to any disclaimer, the term of this patent is extended or adjusted under 35 U.S.C. 154(b) by 59 days.

(21) Appl. No.: 14/235,573

(22) PCT Filed: Aug. 29, 2012

(86) PCT No.: PCT/FR2012/051953
§ 371 (c)(1),
(2), (4) Date: Jan. 28, 2014

(87) PCT Pub. No.: WO2013/030509
PCT Pub. Date: Mar. 7, 2013

(65) Prior Publication Data
US 2014/0174369 A1 Jun. 26, 2014

(30) Foreign Application Priority Data
Aug. 30, 2011 (FR) .................................. 11 57637

(51) Int. Cl.
*A01K 1/00* (2006.01)
*A01K 1/01* (2006.01)

(52) U.S. Cl.
CPC .............. *A01K 1/011* (2013.01); *A01K 1/0107* (2013.01); *A01K 1/0114* (2013.01); *A01K 1/0125* (2013.01)

(58) Field of Classification Search
USPC ................. 119/161, 162, 165, 166, 168, 28.5
See application file for complete search history.

(56) References Cited

U.S. PATENT DOCUMENTS

| 2,671,427 | A | * | 3/1954 | Fell | 119/166 |
| 3,233,588 | A | * | 2/1966 | Thomas | 119/166 |
| 3,818,865 | A | * | 6/1974 | Sinclair | 119/161 |
| 3,842,803 | A | | 10/1974 | Temel | |
| 4,096,827 | A | | 6/1978 | Cotter | |
| 4,493,288 | A | * | 1/1985 | van der Kolk | 119/164 |
| 5,261,350 | A | * | 11/1993 | Vavrek | 119/484 |
| 5,755,181 | A | * | 5/1998 | Petkovski | 119/163 |

(Continued)

FOREIGN PATENT DOCUMENTS

| FR | 2 842 700 A1 | 1/2004 |
| FR | 2 873 263 A1 | 1/2006 |

OTHER PUBLICATIONS

International Search Report, dated Dec. 13, 2012, from corresponding PCT application.

*Primary Examiner* — Richard Price, Jr.
(74) *Attorney, Agent, or Firm* — Young & Thompson

(57) ABSTRACT

Toilet equipment (1) for domestic animals, includes: (i) a frame/container (2) including an element for attaching same to a supporting structure, and together defining a recess (6) provided with elements (8) for spraying water and a collection and discharge unit (11) including a recovery tub (12) provided with a system for connecting same to a wastewater network or to a collector (13) via a discharge device (14), such as a pump or valve, which is built into the frame/container; (ii) a front movable panel (3) for enabling a pivotal movement between a closed and an open position in a horizontal or substantially horizontal plane by biasing a hinge (18) having a horizontal axis; and (iii) elements (22, 25) for providing a seal between a peripheral rim (5) of the recess of the frame/container and a peripheral edge (17) of the movable panel when the latter is in the closed position.

19 Claims, 7 Drawing Sheets

(56) References Cited

U.S. PATENT DOCUMENTS

| | | | | |
|---|---|---|---|---|
| 5,842,438 A | * | 12/1998 | Messmer | 119/165 |
| 6,561,131 B1 | * | 5/2003 | Schwartz | 119/166 |
| 7,673,584 B2 | * | 3/2010 | Aley | 119/161 |
| 2007/0163508 A1 | | 7/2007 | Gloor | |

* cited by examiner

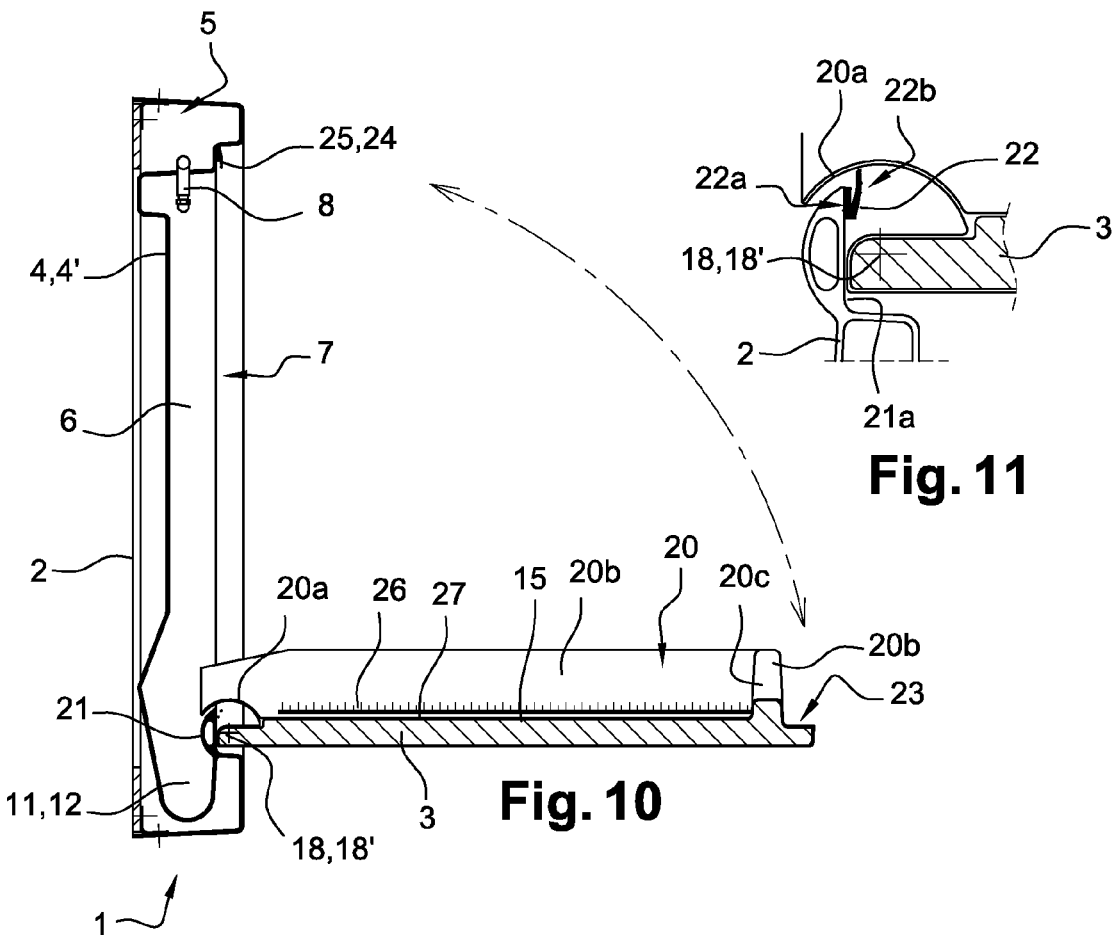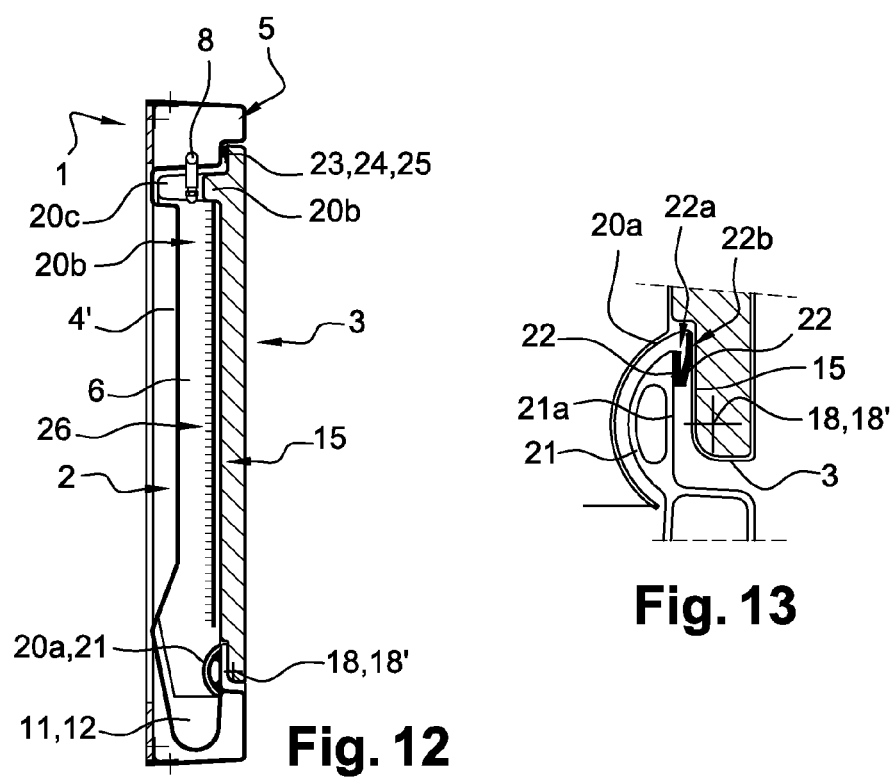

TOILET EQUIPMENT FOR DOMESTIC ANIMALS, IN PARTICULAR FOR DOGS

BACKGROUND OF THE INVENTION

The present invention relates to the toilet installations for domestic animals, in particular for dogs.

DESCRIPTION OF THE RELATED ART

Many toilet structures for receiving faeces (excrements, urine) of domestic animals are known, such as sand boxes for example, or comprising a fixed horizontal surface on which suitable absorbent materials are added.

But the present installations occupy a non-negligible floor space, even when they are not in use, which is a problem in places where the available surface area is limited, as in ships or planes for example. Moreover, the known installations are not always simple to clean.

Some installations tend to respond the best to these problems about size and cleaning.

Therefore, the prior documents FR-2 873 263 and FR-2 842 700 describe a toilet installation for domestic animals, in particular for dogs, comprising:

(i) a receiving frame including a vertical or substantially vertical back edged with a peripheral flange, defining together a housing provided with a front opening, which housing includes water spraying means arranged in its upper part, and collection and discharge means in the form of a recovery tub arranged in its lower part, and (ii) a front movable panel articulated at the lower part of the front opening of the housing of said receiving frame, to allow its pivoting between—a closed position, in which said front panel extends in a vertical or substantially vertical plane and in which it closes said front opening of the housing of the receiving frame, and—an open position.

In this installation, the liquid faeces are recovered in a recovery tub; and the front movable panel is separable from the receiving frame, so that it can be laid flat on the ground in order to receive the animal.

But such an installation is not fully satisfying in that it is deprived of means ensuring the tightness between the receiving frame and the movable panel, when the latter is in the closed position. Moreover, such an installation is not automatable, making a human intervention necessary both for the use and for the cleaning.

The document U.S. Pat. No. 3,842,803 describes a toilet installation for domestic animals designed to be installed horizontally on the ground, including several volumes that are tight and isolated from the outside.

Such installation has the drawback that the draining pump, connected to a discharge duct, is external to the system and is part of a black water treatment system.

The corresponding installation has hence the drawback not to be a compact monolithic unit and to occupy a non-negligible horizontal surface.

SUMMARY OF THE INVENTION

The present invention has for object to propose a new toilet installation for domestic animals, adapted to occupy a limited space, which is very easy to use and to clean.

Given its structure, this installation is particularly adapted to be used onboard a vehicle in move, in particular a ship or an aircraft.

This installation forms a system that can be automated to limit at most the human interventions, whether it is for the use or for the cleaning.

For that purpose, according to the invention, this particular installation comprises:

(i) a receiving frame including a vertical or substantially vertical back edged with a peripheral flange, defining together a housing provided with a front opening that extends in a vertical or substantially vertical plane, which housing includes—water spraying means arranged in its upper part, and—collection and discharge means in the form of a recovery tub arranged in its lower part, and (ii) a front movable panel, delimited by an inner face, an outer face and a peripheral edge, which front panel is articulated at the lower part of the front opening of the housing of said receiving frame, to allow a pivoting of said front panel between—a closed position, in which said front panel extends in a vertical or substantially vertical plane and in which it closes said front opening of the housing of the receiving frame, and—an open position.

This installation according to the invention is marked out in that:

the receiving frame includes means for its attachment to a supporting structure, the recovery tub is provided with means for its connection to a wastewater network or to a collector, through a discharge device such as a pump or a valve, integrated to the receiving frame, the front panel is fastened to said receiving frame through a hinge of horizontal axis that allows its pivoting between the closed position and the open position in which it extends in a horizontal or substantially horizontal plane, and it also includes means ensuring the tightness between the peripheral flange of the housing of said receiving frame, and the peripheral edge of the movable panel when the latter is in the closed position.

Due to this combination of distinctive characteristics, when the front movable panel is in the open position, horizontally extended, its inner face constitutes a surface for receiving the animal, on which the latter can do its business; once in position on this horizontal panel, the male dogs may also urine against the vertical back of the receiving frame.

And once the movable panel placed in the vertical closed position, the closed internal housing of the installation may be cleaned by activation of the water spraying means. These water spraying means ensure the cleaning in particular of the inner face of the movable panel and of the vertical back of the receiving frame; the soiled liquid reaches by gravity the lower collection means, in order to be discharged toward the wastewater network or in a suitable collector.

Moreover, when the movable panel is in the vertical closed position (i.e. generally most of the time), the size of the installation is very limited (this size may then correspond to only the horizontal surface occupied by the receiving frame).

The water spraying means preferably consist in at least one nozzle mounted on a duct connected to a clean water supply network.

According to another characteristic, the axis of articulation of the movable panel on the receiving frame is located above the level of the collection and discharge means.

In a preferred embodiment, the peripheral edge of the front movable panel is provided with a peripheral flange protruding on the side of its inner face, which peripheral flange is adapted to fit into the peripheral flange of the housing of the receiving frame, when said movable panel is in the closed position.

According to still another feature, the front movable panel and the receiving frame include complementary lips in the form of tube portions, arranged along the axis of articulation of said movable panel; a sealing gasket is added between said complementary lips to ensure the tightness between them.

In this case, the lip of the movable panel is arranged in such a manner to cover permanently the complementary lip of the receiving frame during the operation of the movable panel between its open and closed positions.

According to another characteristic, the inner face of the movable panel is advantageously covered with a perforated receiving surface; moreover, an interval or a network of channels is arranged between said perforated receiving surface and said inner face of said movable panel to allow the flow of the liquids. On the other hand, the front face of the vertical back of the receiving frame advantageously includes an anti-splash protrusion (to limit the splashes of urine of the male dogs).

In an improved embodiment, the installation includes means for ensuring the opening and closing operation of the movable panel, controlled by control means.

Yet according to an advantageous characteristic, the installation includes a motor to ensure the rotational opening and closing movement of the movable panel; this motor is advantageously controlled by push-button(s), by a remote-control, by a presence detection system, by a card or an emitter worn by the animal.

Still according to an advantageous characteristic, the installation includes a dedicated automaton, suitably programmed according to the needs and devices in presence, possibly in association with one or several suitable sensors, ensuring the management of the cleaning cycles and possibly the opening and the closing of the movable panel.

BRIEF DESCRIPTION OF THE DRAWING FIGURES

The invention will be further illustrated, without being limited in anyway, by the following description of a particular embodiment, given only by way of example and shown in the appended drawings, in which:

FIG. 10 is a schematic side view of the installation illustrated in FIGS. 5 to 8, whose movable panel is in the open position;

FIG. 11 is a detail view of FIG. 10, to show the cooperation of the complementary lips when the movable panel is in the open position;

FIG. 12 is a side view that shows the same installation with its front movable panel in the vertical closed position;

FIG. 13 shows the same detail as FIG. 11, wherein the movable panel is operated in the open position.

DETAILED DESCRIPTION OF THE INVENTION

Figure 1:
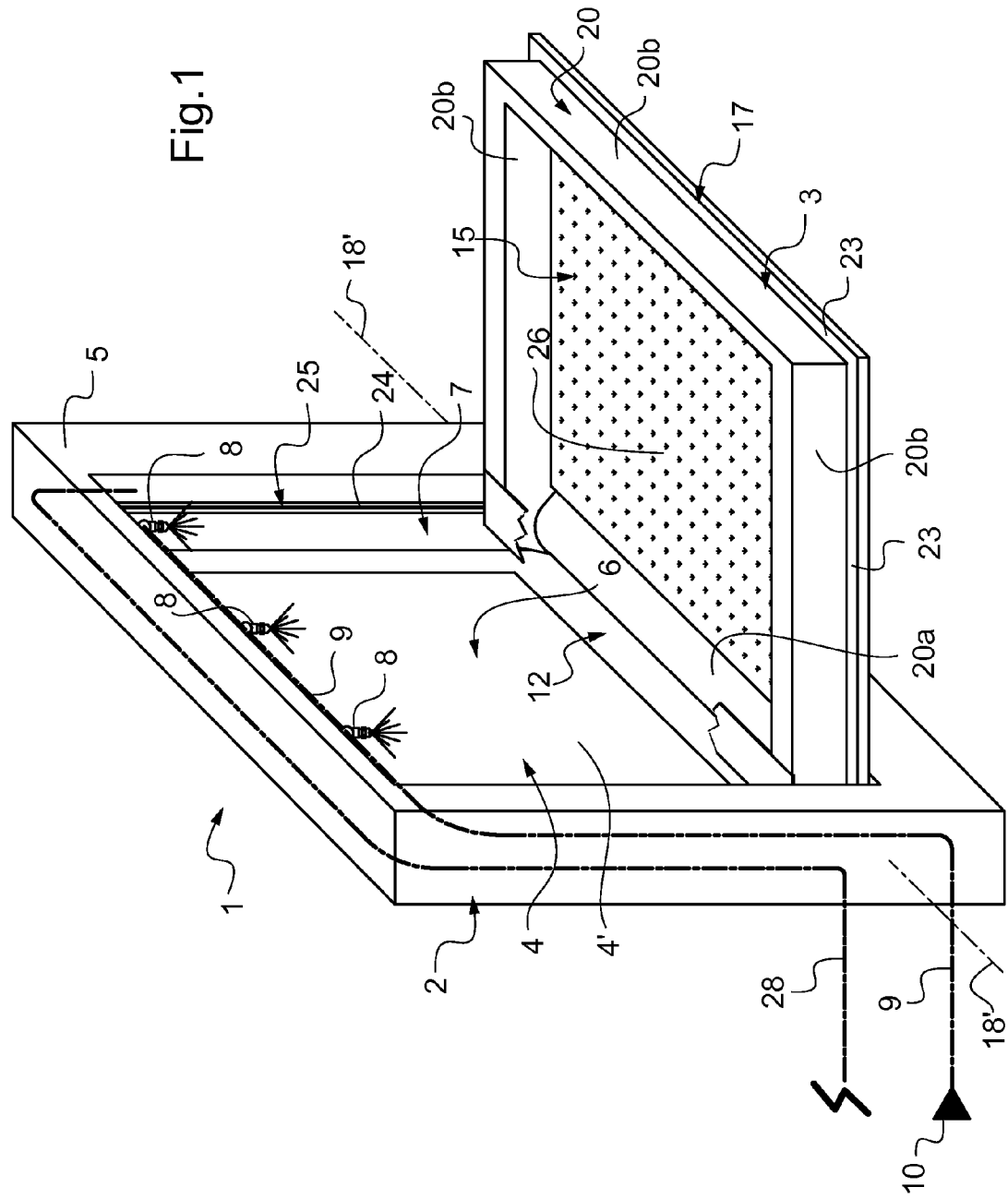
FIG. 1 is a schematic perspective representation of the installation according to the invention, viewed slightly from above, with its movable panel in the open position, fully extended.

The toilet installation 1 illustrated in FIGS. 1 to 4 is mainly addressed to dogs, for receiving and discharging their faeces (urine and excrement), but it may of course be used by other domestic animals (cats, monkeys . . . ).

This installation 1 is consisted of a fixed receiving frame 2 to which is articulated a movable front panel 3.

In the case of an installation 1 for a marine vehicle, in particular a ship, the constitutive materials are chosen among those which resist to the marine corrosion; barrels and isolating washers are advantageously provided to separate the metals from remote galvanic potentials; the conductors and electric devices advantageously fulfill the regulations in force; the constitutive means are sized in such a manner to resist to the accelerations and motions met during the maritime navigation.

For an installation intended to be implanted in an aircraft, the materials of high mechanical strength and low density are preferred; the whole synthetic materials, the facilities, the conductors and the electric devices are in accordance with the regulations in force; the structural elements are sized in such a manner to resist to the accelerations and motions met during the air navigation.

In particular, the receiving frame 2 and the movable panel 3 may be made of composite materials, plastic, stainless steel sheet or a combination of these materials. Access doors for disassembly and maintenance are preferably provided and suitably positioned; they are advantageously provided with sealing gaskets.

The whole toilet installation 1 has advantageously an homogeneous and ordinary aspect to allow its implantation in areas of circulation such as outer or inner walkways.

The receiving frame 2 has the form of a caisson, herein generally parallelepipedal in shape, including a vertical or substantially vertical back 4 that is edged by a peripheral flange 5 (forming a king of framing).

This peripheral flange 5 protrudes from the front face 4' of the vertical back 4, and they define together a housing 6 provided with a front opening 7 that extends in a vertical or substantially vertical plane. This front opening 7 has hence a parallelepipedal quadrangular general outline (for example, square or rectangular).

The receiving frame 2 integrates one or several nozzles 8 for spraying water or another suitable liquid (herein three in number).

These nozzles 8 are placed in the upper part of the housing 6 and are mounted on a duct 9 connected to a clean water supply network 10.

The duct 9 advantageously includes, upstream of the nozzles 8, a solenoid valve 9a (illustrated in particular in FIG. 6 of the second embodiment), to control the fluid supply of the nozzles 8.

Figure 2:
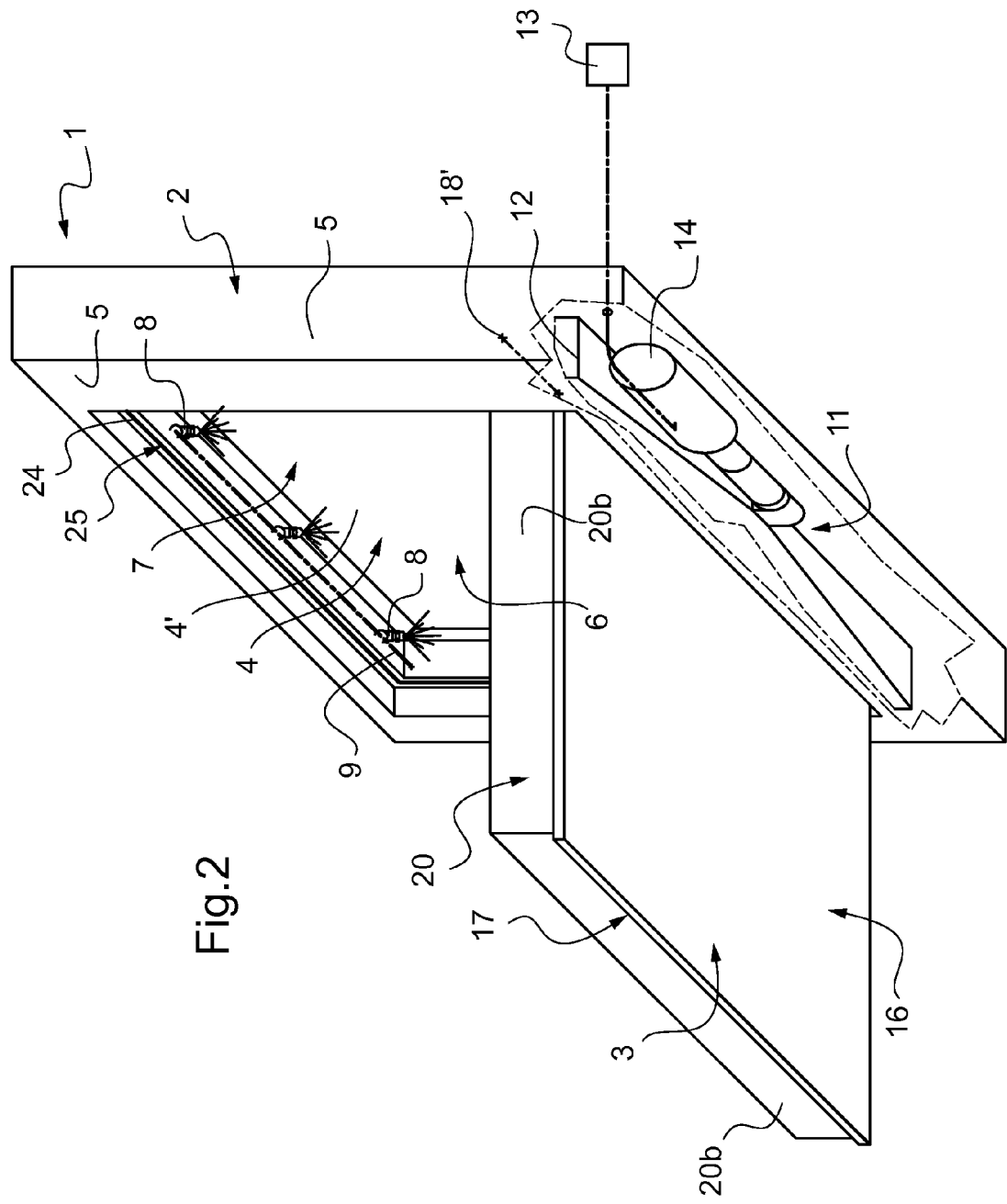
FIG. 2 is a representation similar to FIG. 1, the installation being herein viewed in perspective, slightly from below.

This receiving frame 2 also includes, in its lower part, means 11 for collecting and discharging the liquids (FIG. 2).

These means 11 consist in a recovery tub 12 that is arranged at the lower part of the housing 6 and that is provided with a system for the connection to a wastewater network or collector (schematized in 13 in FIG. 2), through, herein, a discharge pump 14.

The recovery tub 12 is open on the top, in communication with the housing 6, for collecting the different fluids and faeces.

The discharge pump 14 may be chosen among the mud pumps of the centrifugal type (equipped with shredding knives or profiles); it is herein integrated to the receiving frame 2.

The connection system (not shown) consists, for example, in a fast connector/adapter for pipes.

The front face 4' of the vertical back 4 includes a protrusion (not shown) adapted to limit the splashes following the reception of a jet of urine (presence of pins or cells, for example); it may be made of synthetic or natural materials, or a combination of such materials.

This protrusion may for example be consisted by a very finely braided stainless steel wire mesh, that is offset by a few millimeters from the front face 4'.

The front movable panel 3 consists in a plate delimited by an inner face 15, an outer face 16 and a quadrangular (square or rectangular) peripheral edge 17.

The shape of this movable panel 3 is at least approximately complementary of the front opening 7 of the housing 6; its size may be of the order of 600 mm×600 mm.

Figure 3:
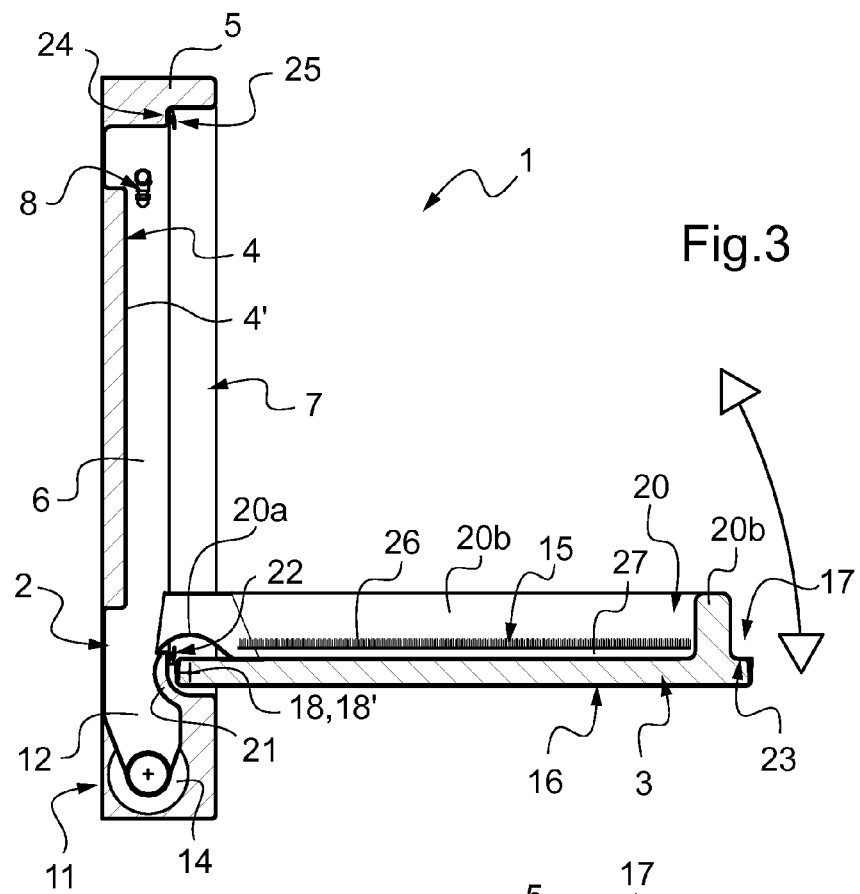
FIG. 3 is a schematic side view of the installation illustrated in FIGS. 1 and 2.
Figure 4:
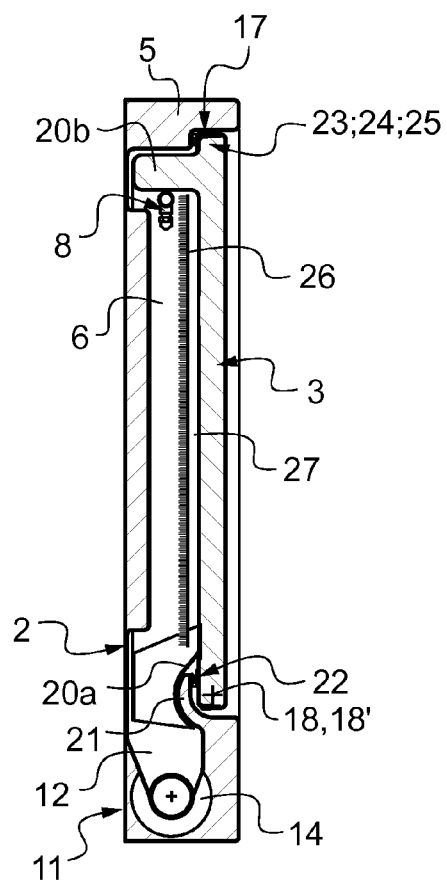
FIG. 4 is a side view that shows the same installation with its front movable panel in the vertical closed position.

A portion or section of this peripheral edge 17 is fastened with the receiving frame 2, at the lower part of the housing 6, through a hinge 18 of horizontal axis 18', to allow the pivoting of the panel 3 between:
- an open position, in which it extends in a horizontal or substantially horizontal plane (FIGS. 1 to 3), and
- a closed position, in which it extends in a vertical or substantially vertical plane and in which it fully closes the front opening 7 of the housing 6 of the receiving frame 2, like a door (FIG. 4).

As can be seen in FIGS. 1 to 4, the peripheral edge 17 of the front movable panel 3 is provided with a peripheral flange 20 (20a, 20b), protruding on the side of its inner face 15, and which is adapted to fit into the peripheral flange 5 of the receiving frame 2, when said panel 3 is in the closed position (FIG. 4).

More precisely, on the side of the hinge 18, the movable panel 3 includes a rectilinear lip 20a, in this case a profile element in the form of a tube portion or with an arc of a circle section or an arc of an ellipse section, that opens on the side of the outer face 16 of the movable panel 3.

This rectilinear lip 20a cooperates with a complementary lip 21, also a profile in the form of a tube portion or with an arc of a circle section or an arc of an ellipse section, arranged in the lower part of the housing 6 of the receiving frame 2, from the opposite peripheral frame 5.

This complementary lip 21, which is fixed, extends remote and opposite the front face 4' of the vertical back 4 of the receiving frame 2; it extends over the whole length of a lower horizontal section of the peripheral flange 5.

The profiles of these two complementary lips 20a and 21 are adapted to permanently fit each other, at least in part, between the open and closed positions of the panel 3, as can be seen in FIGS. 3 and 4.

In particular, the rectilinear lip 20a of the movable panel 3 includes a lower face covering permanently the fixed complementary lip 21.

The rectilinear lip 20a of the movable panel 3 is further arranged so as to extend permanently outside the overall size of the upper opening of the recovery tub 12.

The radius of the lower face of the lip 20a of the movable panel 3 is substantially greater than the radius of the outer face of the complementary lip 21, so that the two opposite faces fit each other during the rotation of the movable panel 3 about the horizontal axis 18 and avoid the leakages of liquids.

Therefore, the lip 20a of the movable panel 3 has also the function of masking a lower longitudinal gasket 22 equipping the complementary lip 21, and hence protecting this lower gasket 22 against possible damages causes by the animal (for example with its claws or its teeth).

In these FIGS. 3 and 4, it can be observed that the complementary lip 21 has the sealing gasket 22 at its upper end, on the inner side.

This gasket 22 is intended to come flat against the lower edge opposite the inner face 15 of the panel 3, when the latter is in the closed position.

On the remaining of the outline of the inner face 15 of the movable panel 3 (i.e. on the three remaining sides), the peripheral flange 20b has a straight section to form a kind of U-shape peripheral framing intended, in particular, to stop the possible peripheral flows of liquids when the movable panel 3 is in the open horizontal position and to direct these liquids toward the collection means 11.

This peripheral flange 20b extends in protrusion, slightly back relative to its peripheral edge 17, so as to preserve a peripheral shoulder 23 extending parallel to said inner face 15.

When the panel 3 is in the closed position, this shoulder 23 is intended to come flat against an opposite shoulder 24, which is arranged in the inner face of the peripheral flange 5 of the receiving frame 2 (on its lateral and upper sides), and on which is added a sealing gasket 25 (advantageously by adhesive).

The flanges 20a, 20b limit the possibilities of liquid leakages, from the inside of the housing 6 to the outside, when its opening 7 is closed by the panel 3.

The gaskets 22 and 25 form a continuous peripheral band, completing and ensuring this tightness.

These gaskets 22, 25 ensure a complete tightness to liquids and odors when the movable panel 3 is in the closed position.

As can be seen in particular in FIG. 4, the articulation axis 18' of the movable panel 3 is located above the level of the liquid collection and discharge means 11 (and in particular above the recovery tub 12).

In FIG. 4, it can also be observed that the water spraying nozzles 8 are positioned in the upper part of the housing 6, outside the overall size of the peripheral flange 20b, when the movable panel 3 is in the closed position.

The inner face 15 of the movable panel 3 is covered with an added surface 26, forming a grating for receiving the animals.

This added receiving surface 26 is made of a synthetic or a natural material, or a combination of such materials. It is advantageously made porous or perforated, so that the liquids (urine and washing water) can pass through it.

The added surface 26 may hence be consisted of a grating adapted to the paws of small dogs, but it is more advantageously consisted of perforated synthetic grass, which is laid on a perforated metal sheet or a stainless steel grating.

As can be seen in FIGS. 3 and 4, this receiving surface 26 is mounted remote from the inner face 15, opposite the movable panel 3 (by a few millimeters or a few tens of millimeters), held by adapted cross-members (not shown), to form an interval 27 for optimizing the recovery of the liquids and facilitating the cleaning.

This interval 27 may possibly be replaced by a network of channels.

The upper plane of the receiving surface 26 is located under the upper level of the peripheral flange 20*b* of the panel 3.

Therefore, the movable panel 3 is capable of a rotational movement (pivoting) from the horizontal position (FIGS. 1 to 3) to the vertical position (FIG. 4), and the reverse. The corresponding pivotal movement may be controlled manually, assisted by effort limiting means, or also partially or fully motorized and/or automated.

The corresponding motor (not shown) may be piloted by control and signaling means such as push-button(s) and indicator(s), a remote-control, a presence detection system, or also an emitter worn by the animal.

It may also be controlled by a payment system, for public use, as a function of the site of implantation.

In operation, the movable panel 3 is brought in horizontal position to receive the animal. The latter comes on the horizontal receiving surface 26 surrounded by the flange 20*b*; it does its business, either directly on said receiving surface 26, or on the anti-splash face 4' of the vertical back 4, or both.

The excrements are deposited on the receiving surface 26, whereas the urines are recovered either under said horizontal receiving surface 26, by the inner face 15 of the panel 3 that forms a kind of tub (in the interval 27), or directly in the recovery tub 12.

Once the animal has left the installation, the movable panel 3 is brought in the vertical position (FIG. 4), either manually, or, as mentioned above, by means of an assisted or motorized mechanism.

In the case of an automated device, a system of security may be provided to forbid the movement of the movable panel 3 if the animal is still present on the latter.

When the movable panel 3 is in the vertical position, the installation 1 defines the single housing 6 that is delimited by:
 the front face 4' of the vertical back 4, on the rear,
 the added surface 26 and the inner face 15 of the movable panel 3, on the front,
 the peripheral flange 20*b* of the movable panel, on the top and on the sides, and
 the recovery tub 12, on the bottom.

The cleaning can start; the water or the cleaning liquid is supplied to the nozzles 8 to initiate a suitable washing cycle.

This washing water, which may contain any desired cleaning or odorous agent, is sprayed for the cleaning of all the walls of the housing 6 (in particular the vertical walls 4' and 15 thereof), as well as the receiving surface 26. The transit of the excrements is advantageously made by gravity toward the recovery tub 12, upon the rising of the movable panel 3.

The discharge pump 14 sucks up the residue in the lower recovery tub 12 and sends them out to the wastewater network 13.

In the case of an automated installation, the management of the cleaning cycles, and possibly of the opening and closing of the movable panel 3, is ensured by control means integrating a dedicated automaton, suitably programmed according to the needs and devices in presence (possibly in association with one or several suitable sensors).

A possible embodiment of such control means is described hereinafter in relation with the second embodiment, in relation with FIG. 9.

The installation includes for that purpose a power supply 28.

The receiving frame 2 ensures the holding of the whole unit, as well as the fixation of the installation to a supporting structure (wall, partition, or other), by any suitable means.

For that purpose, the rear face 4" of the vertical back 4 (visible in particular in FIG. 7 for the second embodiment) includes herein fixation holes (not shown), advantageously adapted for the arrangement of screw-bolt means on the supporting structure, such as an external superstructure partition of a ship or an aircraft partition.

This receiving frame 2 houses the operating mechanisms, the control systems, the possible automatic and servo systems, as well as the required electric connections and the connections to the clean water supply and wastewater discharge networks.

The management of the operation of the installation 1 is therefore very simple.

On the other hand, as can be seen in FIG. 4, with the movable panel 3 in the closed position, this toilet installation 1 has an ordinary aspect and occupies a very limited projected horizontal surface, which allows it to be implanted in areas dedicated to other functions, for example areas of passage (such as corridors, for example).

That way, such an installation 1 finds a particularly interesting application in the equipment of ships or passenger liners (yachts, super yachts, charter or merchant ships), private planes or aircrafts, hotels, individual and collective accommodations, private and public spaces, or also public ways, in particular.

As a variant, it can be noticed that the discharge pump provided in the embodiment described above, may be replaced, according to the applications and devices in presence, by a valve for isolation from a vacuum discharge network.

To ensure the stability thereof in the open position, the movable panel 3 may be provided with one or several retractable or fixed support feet (not shown).

On the other hand, in the case of devices liable to be used by several animals, it may be provided a diffusor of attractive product(s), manually or automatically controlled.

Another possible embodiment of the invention is illustrated in FIGS. 5 to 13.

This installation according to FIGS. 5 to 13 is similar to that described hereinabove in relation with FIGS. 1 to 4, and differs from it by only a few technical characteristics developed hereinafter.

By way of simplification, the reference characters used for the description of FIGS. 1 to 4 will be kept for designing the identical or similar structural elements.

Here again, this installation 1 is consisted of the fixed receiving frame 2 on which is articulated the front movable panel 3.

The receiving frame 2 is still in the form of a caisson, generally parallelepipedal in shape, including a vertical or substantially vertical back 4 that is edged by the peripheral flange 5 protruding from the front face 4' of the vertical back 4.

This receiving frame 2 still includes the housing 6 provided with the front opening 7 that extends in a vertical or substantially vertical plane and that has a parallelepipedal quadrangular general outline (for example, square or rectangular).

Figure 5:
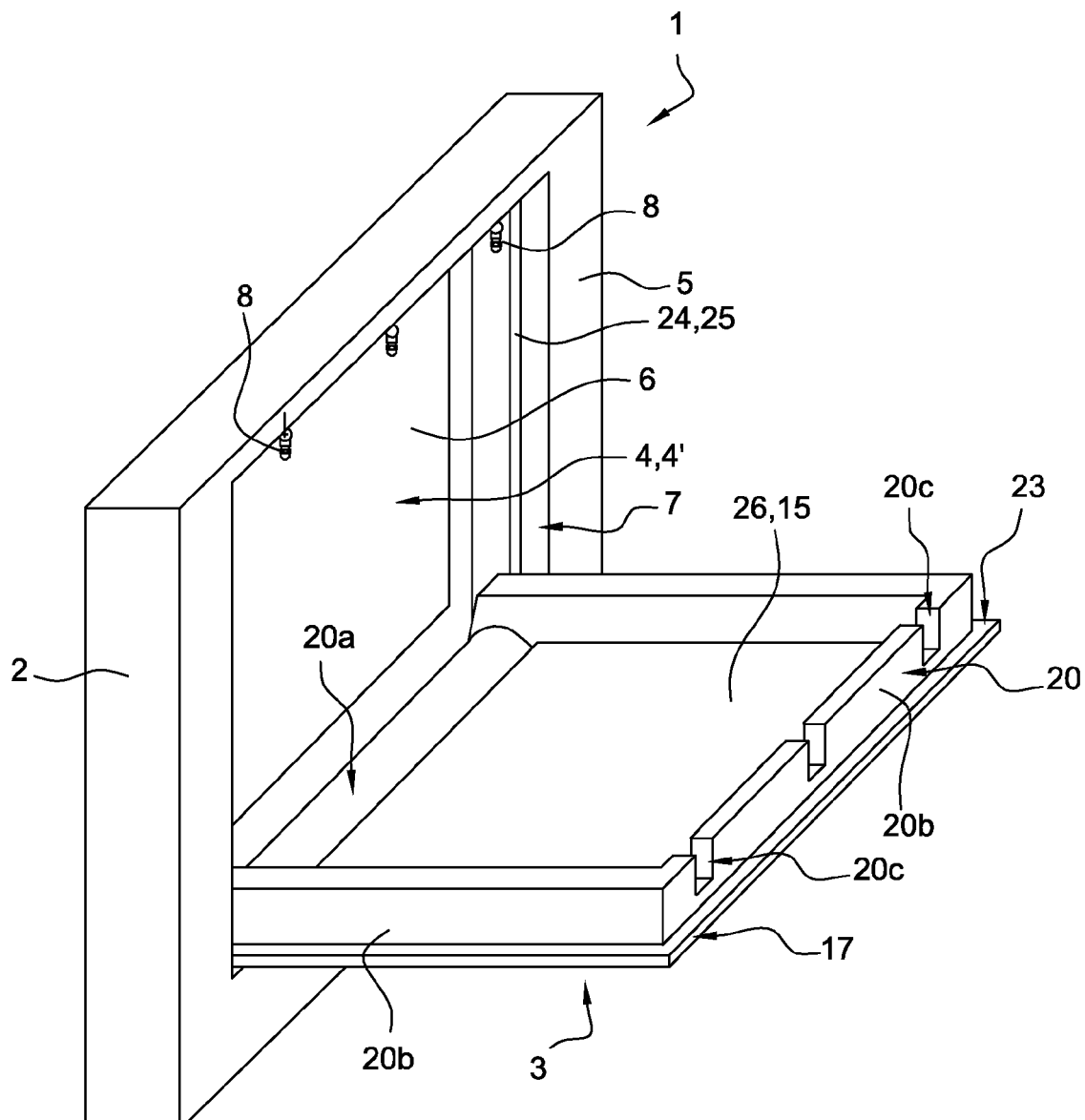
FIG. 5 is a schematic perspective representation of a variant of the installation according to the invention, viewed slightly from above, with its movable panel in the open position.
Figure 6:
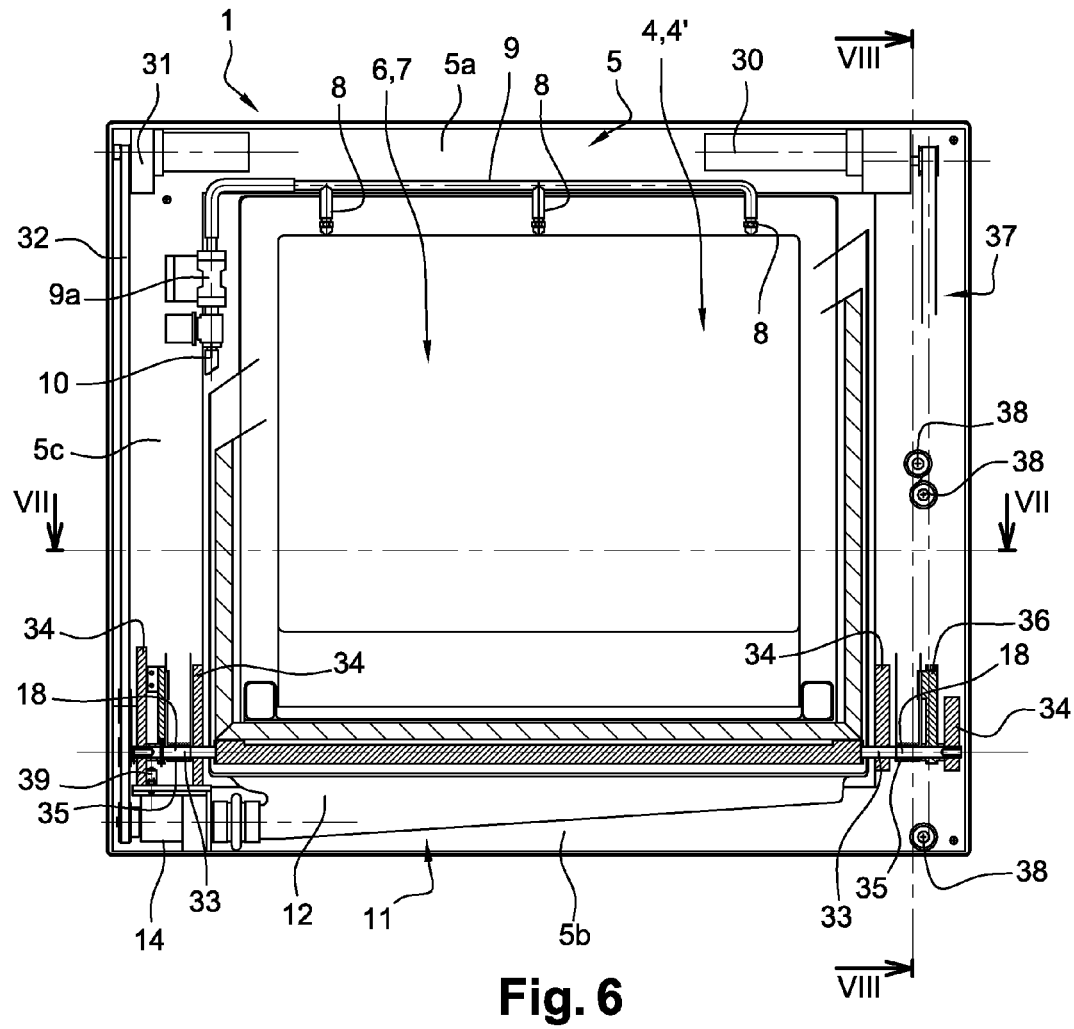
FIG. 6 is a schematic front representation of the installation according to FIG. 5, with its receiving frame in vertical cross-sectional view.

The receiving frame 2 still integrates one or several nozzles 8 for spraying water or another suitable liquid (herein three in number), arranged in the upper part of the housing 6 and mounted on the duct 9 intended to be connected to the clean water supply network 10 (FIGS. 5 and 6).

The nozzle(s) 8 are herein arranged directly at an upper longitudinal section 5*a* of the peripheral flange 5 (FIG. 6).

In the present embodiment, and as illustrated in FIG. 6, this upper section 5*a* of the peripheral flange 5 still integrates:

a first motor 30, intervening in the operation of the movable panel 3 between its open and closed positions, and a second motor 31, intervening in the operation of the collection and discharge means 11.

The integration of the motors 30 and 31 in the upper section 5a of the peripheral flange 5 allows optimizing the overall size of the installation 1.

These motors 30 and 31 consist in electric motors, having advantageously a minimal overall size.

The first motor 30 consists advantageously in an electric operating gear motor.

This electric gear motor 30 has two rotation directions and is preferably supplied with direct current, for example 24 VDC (this voltage being commonly used and generally available onboard).

The electric gear motor 30 is advantageously of the reversible type, to allow the automatic rotation of the movable panel 3 in the opening and the closing directions.

In its lower part, the liquid collection and discharge means 11 are still present.

These means 11 also consist in a recovery tub 12 arranged at the lower part of the housing 6, i.e. at the level of the lower section 5b of the peripheral flange 5 (FIG. 6).

The recovery tub 12 is provided with the system for connection to a wastewater network or collector (not visible herein), through the discharge pump 14 driven by the second dedicated motor 31.

The operation of the discharge pump 14 is herein ensured by a transmission belt 32 extending over the height of a lateral vertical section 5c of the flange 5 (FIG. 6).

The front movable panel 3 also consists in a quadrangular (square or rectangular) plate, whose shape is, at least approximately, complementary of the front opening 7 of the housing 6.

The hinge 18, for the pivoting of the movable panel 3 between its open and closed positions, herein consists in a cylindrical axis 33 equipping the movable panel 3, guided in rotation by side bearings 34 equipping the receiving frame 2 (FIG. 6).

The cylindrical axis 33 is equipped with elastic return means, in this case torsion springs 35 (also called angular action springs), intended in particular to limit the effort of operation toward the closed position from the open position.

For that purpose, these springs 35 are tensioned upon rotation in the direction of opening of the movable panel 3 and they release the tension effort during the rotation in the direction of closing of the movable panel 3. For a heavier movable panel 3, the torsion springs 35 may be replaced by two gas spring cylinders suitably positioned.

Figure 8:
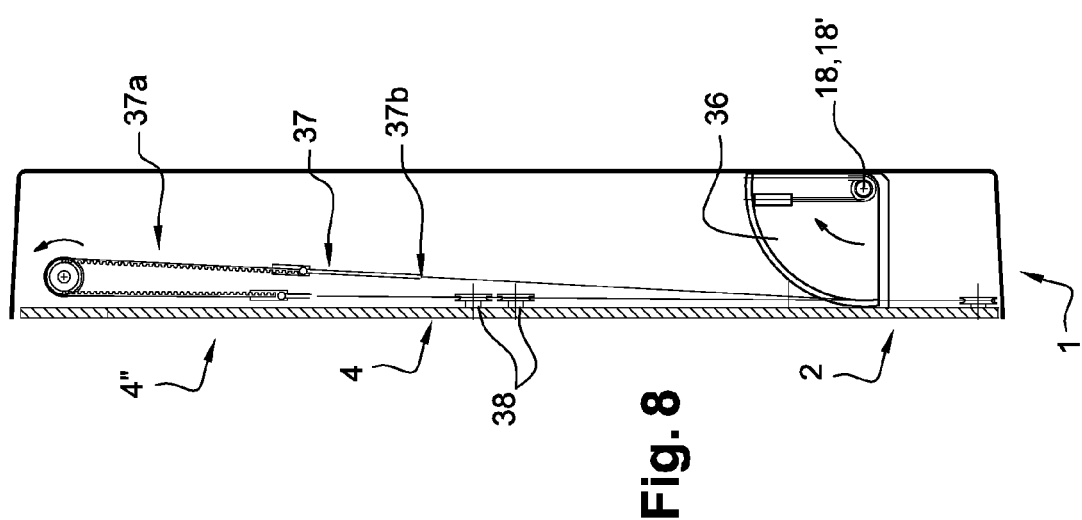
FIG. 8 is a sectional view of the installation according to FIG. 5, along the vertical plane of section VIII-VIII of FIG. 6.

For the operation in rotation of the movable panel 3, the cylindrical axis 33 carries a member 36 in the form of an angular sector, which is connected to the first motor 30 by suitable transmission means 37 (FIGS. 6 and 8).

As schematically illustrated in FIG. 8, the transmission means 37 consist in this case in:

a toothed operating belt 37a, cooperating with the motor 30, and a cable 37b, for example made of steel wire, cooperating with pulleys 38 and suitable fastened to the angular sector 36.

These transmission means 37 extend over the height of a lateral vertical section 5c of the flange 5 (FIG. 6).

These operating means 3 are sized in such a manner to ensure the opening and closing of the movable panel 3 in a time period advantageously of the order of 10 seconds.

The open and closed positions of the movable panel 3 are here limited by end-of-travel contacts 39 associated with adjustable strong stops (FIG. 6).

The movable panel 3 is advantageously held in each of the open and closed positions by dedicated locking means, for example a mechanical or electromechanical lock (not shown).

Figure 7:
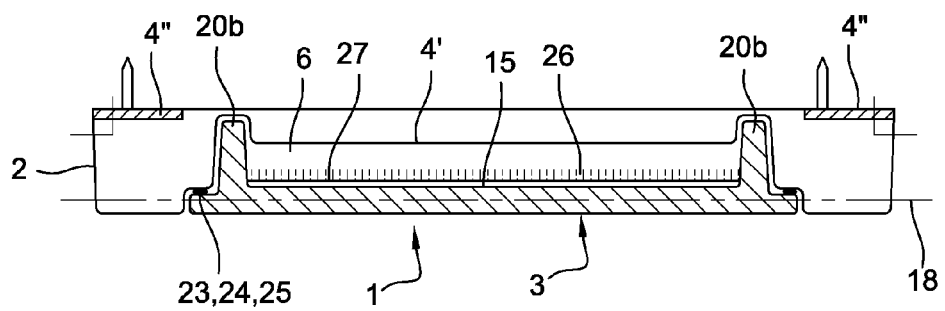
FIG. 7 is a sectional view of the installation according to FIG. 5, along the horizontal plane of section VII-VII of FIG. 6.

The peripheral edge 17 of the front movable panel 3 is provided with the peripheral flange 20 (20a, 20b), protruding on the side of its inner face 15, and which is adapted to fit into the peripheral flange 5 of the receiving frame 2, when said panel 3 is in the closed position (FIGS. 7 and 12).

The rectilinear lower lip 20a of the movable panel 3 is in particular illustrated in FIGS. 11 and 13; it has a structure identical to that described hereinafter in relation with FIGS. 1 to 4.

The complementary lip 21, arranged in the lower part of the housing 6 of the receiving frame 2, is also illustrated in FIGS. 11 and 13; it also has a structure identical to that described hereinafter in relation with FIGS. 1 to 4.

In this case, this complementary lip 21 includes a vertical front face 21a, equipped with the longitudinal gasket 22.

This longitudinal gasket 22 is composed of two bands, forming together a generally V-shaped section, with:

a rear band 22a fastened to the front face 21a of the complementary lip 21, and a front band 22b intended to cooperate with the movable panel 3 so as to ensure a permanent tightness and a scraper action (in the open and closed positions, but also during the passage from the one to the other).

In FIGS. 11 and 13, it can be seen that the longitudinal gasket 22 is intended to cooperate permanently with the movable panel 3, i.e.:

with the lower edge opposite the inner face 15 of the panel 3, when the latter is in the closed position (FIG. 13), and with the lower face of the rectilinear lip 20a of the movable panel 3, when the movable panel 3 is in the open position and during its operation (FIG. 11).

Moreover, the upper section of the flange 20b of the movable panel 3 is provided herein with notches 20c, each intended to receive one of the nozzles 8 when the panel 3 is in the closed position (FIGS. 5 and 12).

On the remaining of the outline of the inner face 15 of the movable panel 3 (i.e. on the three remaining sides), the peripheral shoulder 23, parallel to said inner face 15, equipped with the sealing gasket 25 (FIGS. 5 and 12), is also present.

Here again, the motor 30 for the operation in rotation of the movable panel 3 may be piloted by control and signalization means. Likewise, these control means can pilot the operation of the motor 31 equipping the collection and discharge means 11.

Figure 9:
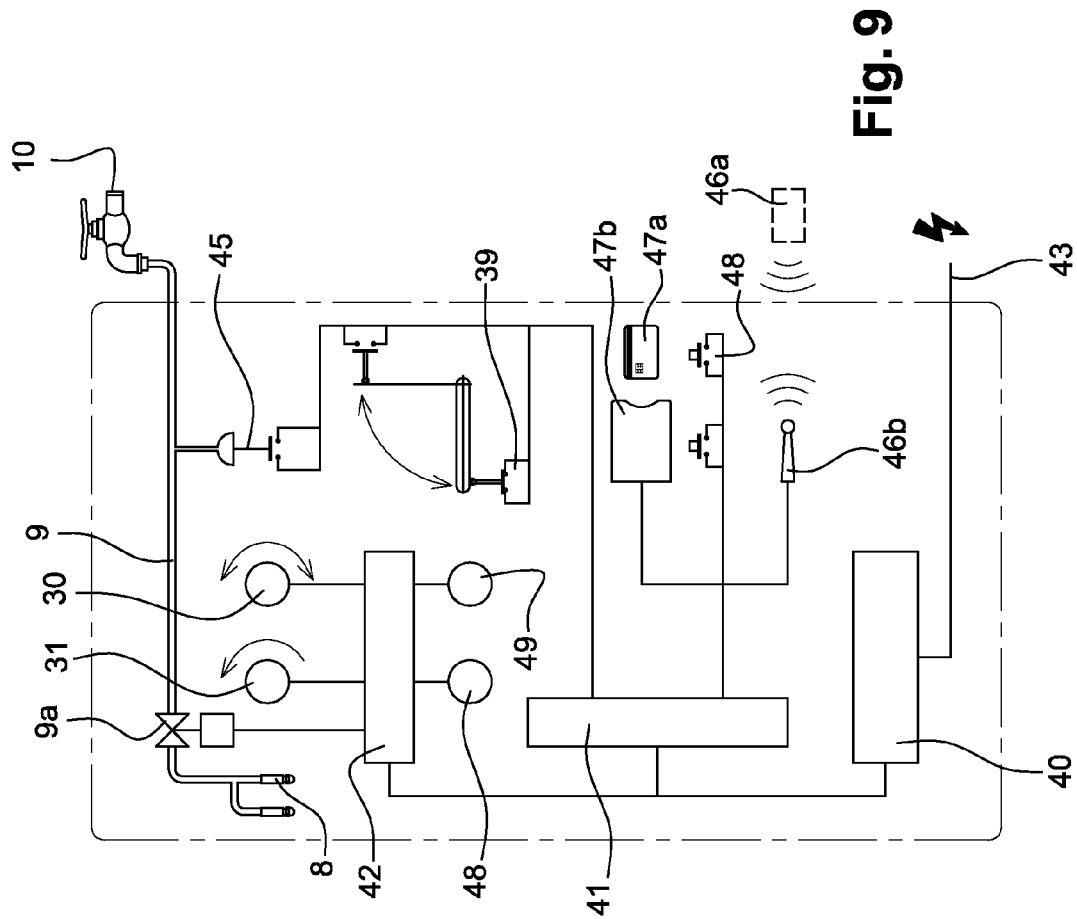
FIG. 9 shows very schematically the structure of the electric/electronic devices equipping the installation according to FIGS. 5 to 8.

The main electric/electronic modules equipping the toilet installation 1, for the control in particular of these motors 30 and 31, are schematized in FIG. 9.

The installation 1 comprises in this case three main electric modules 40, 41 and 42 described in more detail hereinafter.

The modules 40, 41 and 42 are suitably installed in tight cases that are located in the available spaces, preferably in the top part of the flange 5 of the receiving frame 2, between the motors 30 and 31.

A security module 40 receives the general power supply from aboard 43. It comprises the devices for protection against polarity inversions, against short circuits and against overcharges.

A control module 41, forming the control means of the installation 1, receives the putting-into-service commands, for example from a control panel with push-buttons, a remote-control interface, a card reader or any other human-machine dialog interface.

The control interface may be integrated to the receiving frame 2, but it may also be displaced (for example, in the form of an application for a portable digital medium such as a digital tablet or a digital phone).

The control module 41 receives herein the information of the end-of-travel contacts 39, as well as the authorization of operation of a pressure controller 45 equipping the supply duct 9.

The pressure controller 45 is herein provided in order to forbid the operation of the toilet installation 1 if the pressure in the supply network 10 is lower than that specified for a correct operation of the nozzles 8.

The control module 41 further integrates an automaton for the management of the toilet installation 1, which has for function to pilot all the electric/electronic devices provided for the operation of the installation 1.

In particular, this control module 41 is advantageously intended to implement two operation signals: a "ON" signal and a "OFF" signal.

The "ON" signal controls the following successive steps:
the unlocking of the movable panel 3 in the closed position (FIG. 12),
the opening of the movable panel 3, by the operation of the dedicated motor 30, and
the locking of the movable panel 3 in the open position (FIG. 10).

The "OFF" signal, intervening advantageously after the animal has done its business, controls successively:
the unlocking of the movable panel 3 in the open position (FIG. 10),
the closing of the movable panel 3, by the operation of the dedicated motor 30,
the locking of the movable panel 3 in the closed position (FIG. 12),
the opening of the solenoid valve 9a for supplying the nozzles 8,
the operation of the motor 31 driving the discharge pump 14,
the closing of the solenoid valve 9a after a predetermined time interval,
the stopping of the motor 31 driving the discharge pump 14, also after a predetermined time interval.

The cleaning duration is programmed at the configuration of the automaton, as a function of the available flow rate, under the specified pressure of the on-board network. It is generally of a duration of 30 seconds for a consummation of water of the order of 5 L, under a pressure of the order of 200 kPa (or 29 PSI).

The motor 31 driving the discharge pump 14 is started by the management automaton about 8 seconds after the opening of the solenoid valve 9a; and this motor 31 is stopped about 10 seconds after the closing of this solenoid valve 9a.

The installation 1 is released for a new cycle of use for example two minutes after the motor 31 has been stopped; this delay aims to avoid an abnormal warming of the electric motors in case of intensive use of the toilet installation 1.

In case of control by an emitter 46a worn by the animal (schematically shown in FIG. 9), the "ON" signal is given by the entry of the animal in the coverage area of a signal receptor 46b; the "OFF" signal is delivered by the exit of the animal from the same coverage area.

In case of control by a card 47a, the "ON" signal is given by the introduction of the card 47a into a card reader 47b. And the "OFF" signal is obtained, for example, upon removal of the card 47a from the reader 47b.

In case of control by manual actuator(s), the operation is controlled by the action of an operator on dedicated push-buttons 48, for example a button for the "ON" signal and a button for the "OFF" signal.

A power module 42 controls the operation of various elements:
the motor 30 for operating the movable panel 3 in rotation,
the motor 31 for driving the discharge pump 14,
the opening and closing of the solenoid valve 9a,
the means 48 for locking the movable panel 3 in the open position, and
the means 49 for locking the movable panel 3 in the closed position.

For that purpose, this power module 42 comprises the various power supply cards.

In particular, the power supply card for the operating motor 30 includes —the power relay, —the relay for rotation direction inversion, —the maximum charge adjustment, —the rotational speed adjustment, —the acceleration adjustment, and —the deceleration adjustment.

The maximum charge adjustment allows avoiding the movable panel 3 to be moved if the animal is still positioned on the latter.

In this second embodiment, the movable panel 3 is thus here again capable of a rotational movement (pivoting) from the horizontal position (FIGS. 10 and 11) to the vertical position (FIGS. 12 and 13), and the reverse.

A cleaning of the housing 6 can be implemented when the movable panel 3 is in its closed vertical position (FIGS. 12 and 13).

In this case, these operations of the movable panel 3, as well as the washing process, are advantageously automated, under the control of the control means 41 provided for that purpose.

The installation 1 is hence particularly simple of use, by allowing the reduction, or even the elimination, of any human intervention in the operation of the movable panel 3 and in the cleaning thereof.

The invention claimed is:

1. A toilet installation for domestic animals, including dogs, comprising:
    a receiving frame (2) including a vertical or substantially vertical back (4) edged with a peripheral flange (5), defining together a housing (6) provided with a front opening (7), which extends in a vertical or substantially vertical plane, wherein said receiving frame (2) is attachable to a supporting structure;
    a water spraying unit (8) arranged in an upper part of the housing (6);
    a collection and discharge unit (11) arranged in a lower part of the housing, the collection and discharge unit comprising a recovery tub (12);
    a front movable panel (3) delimited by an inner face (15), an outer face (16) and a peripheral edge (17), the front movable panel (3) being articulated at a lower part of the front opening (7) of the housing (6) to allow a pivoting of said front movable panel (3) between i) a closed position, in which said front movable panel (3) extends in a vertical or substantially vertical plane and in which said front movable panel (3) closes said front opening (7) of the housing (6) and ii) an open position;
    a discharge device (14) integrated to said receiving frame (2) and connected to the recovery tub (12), the discharge device allowing removal of liquids from the recovery tub (12);

a hinge (18) that fastens said front movable panel (3) to said receiving frame (2) through a horizontal axis of articulation (18'), the hinge allowing pivoting of the front movable panel (3) between the closed position in which the front movable panel (3) respectively extends in a vertical or substantially vertical plane and the open position in which the front movable panel (3) extends in a horizontal or substantially horizontal plane; and sealing means (22, 25) ensuring the tightness between the peripheral flange (5) of the housing (6) and the peripheral edge (17) of the front movable panel (3) when the front movable panel (3) is in the closed position.

2. The installation according to claim 1, wherein the water spraying unit comprises at least one nozzle (8) mounted on a duct (9) connected to a clean water supply network (10).

3. The installation according to claim 2, wherein the horizontal axis of articulation (18') of the front movable panel (3) on the receiving frame (2) is located above a level of the collection and discharge unit (11).

4. The installation according to claim 2, wherein the front movable panel (3) and the receiving frame (2) include complementary lips (20a, 21) in the form of a tube portion, arranged along the horizontal axis of articulation (18') of said front movable panel (3), and wherein a longitudinal gasket (22) is located between said complementary lips (20a, 21) to ensure the tightness between them.

5. The installation according to claim 1, wherein the horizontal axis of articulation (18') of the front movable panel (3) on the receiving frame (2) is located above a level of the collection and discharge unit (11).

6. currently amended) The installation according to claim 5, wherein the peripheral edge (17) of the front movable panel (3) is provided with a peripheral flange (20) protruding on the side of the inner face (15), which peripheral flange (20) is adapted to fit into the peripheral flange (5) of the housing (6), when said front movable panel (3) is in the closed position.

7. The installation according to claim 6, wherein the front movable panel (3) and the receiving frame (2) include complementary lips (20a, 21) in the form of a tube portion, arranged along the horizontal axis of articulation (18') of said front movable panel (3), and wherein a longitudinal gasket (22) is located between said complementary lips (20a, 21) to ensure the tightness between them.

8. The installation according to claim 5, wherein the front movable panel (3) and the receiving frame (2) include complementary lips (20a, 21) in the form of a tube portion, arranged along the horizontal axis of articulation (18') of said front movable panel (3), and wherein a longitudinal gasket (22) is located between said complementary lips (20a, 21) to ensure the tightness between them.

9. The installation according to claim 1, wherein the front movable panel (3) and the receiving frame (2) include complementary lips (20a, 21) in the form of a tube portion, arranged along the horizontal axis of articulation (18') of said front movable panel (3), and wherein a longitudinal gasket (22) is located between said complementary lips (20a, 21) to ensure the tightness between them.

10. The installation according to claim 9, wherein the lip (20a) of the front movable panel (3) is arranged in such a manner to cover permanently the complementary lip (21) of the receiving frame (2) during the operation of the front movable panel (3) between the open and closed positions.

11. The installation according to claim 1, wherein the inner face (15) of the front movable panel (3) is covered with a perforated receiving surface (26), and an interval (27), or a network of channels, is arranged between said perforated receiving surface (26) and said inner face (15) of said front movable panel (3) to allow the flow of the liquids.

12. The installation according to claim 1, wherein the front face (4') of the vertical back (4) of the receiving frame (2) includes an anti-splash protrusion.

13. The installation according to claim 1, further comprising means (30, 37) for opening and closing operations of the front movable panel (3), controlled by control means (41).

14. The installation according to claim 1, further comprising a motor (30) to ensure rotational opening and closing movement of the front movable panel (3).

15. The installation according to claim 14, wherein the motor (30) is controlled by push-button(s) (48), by a remote-control, by a presence detection system, by a card (47a) or an emitter worn by the animal (46a).

16. The installation according to claim 1, further comprising control means (41) integrating a dedicated automaton, suitably programmed according to needs and devices in presence and ensuring management of cleaning cycles.

17. The installation according to claim 16, wherein the control means (41) operates in association with at least one sensor, and ensures opening and the closing of the front movable panel (3).

18. The installation according to claim 1, wherein,
the discharge device connects to a wastewater network or to a collector (13), and
the discharge device (14) is a pump or a valve.

19. A toilet installation for domestic animals, including dogs, comprising:
a housing defined by a receiving frame (2) that includes a vertical back (4) edged with a peripheral flange (5), the housing (6) provided with a front opening (7) extending in a vertical plane;
a water spraying unit (8) located in an upper part of the housing (6);
a collection and discharge unit (11) located in a lower part of the housing, the collection and discharge unit comprising a recovery tub (12);
a drain device (14) integrated to said receiving frame (2) and connected to the recovery tub (12), the drain device allowing removal of liquids from the recovery tub (12);
a front movable panel (3) delimited by an inner face (15), an outer face (16) and a peripheral edge (17), the front movable panel (3) being articulated at a lower part of the front opening (7) of the housing (6) to allow a pivoting of said front movable panel (3) between i) a closed position, in which said front movable panel (3) extends in a vertical or substantially vertical plane and in which said front movable panel (3) closes said front opening (7) of the housing (6), and ii) an open position; and
a hinge (18) that fastens said front movable panel (3) to said receiving frame (2) through a horizontal axis of articulation (18'), the hinge allowing pivoting of the front movable panel (3) between the closed position in which the front movable panel (3) respectively extends in a vertical or substantially vertical plane and the open position in which the front movable panel (3) extends in a horizontal or substantially horizontal plane.

* * * * *